Oct. 6, 1959 — L. J. DRENTLAW — 2,907,493
CARTON HOLDERS
Filed April 8, 1957 — 2 Sheets-Sheet 2

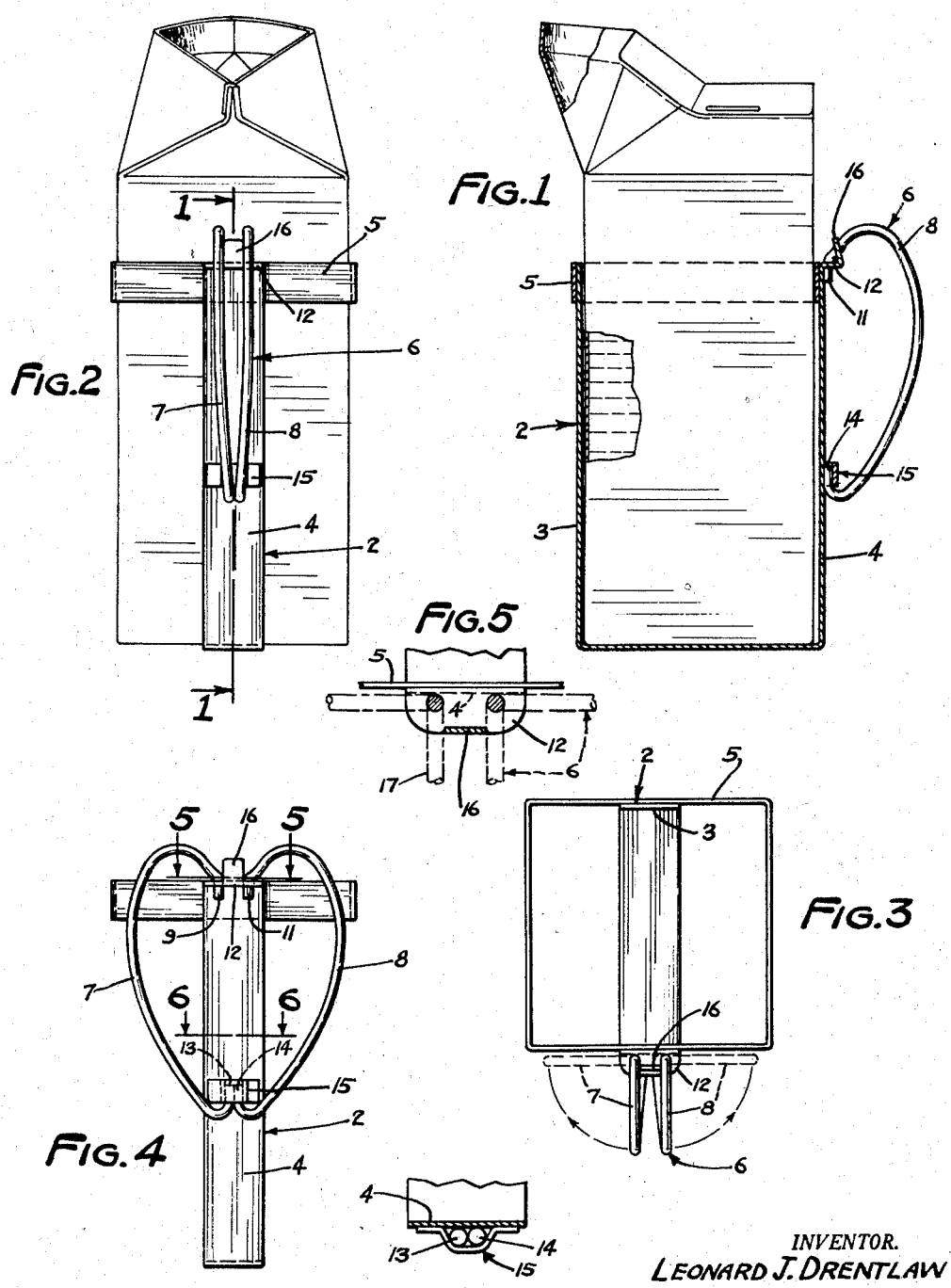

INVENTOR.
LEONARD J. DRENTLAW
BY
Moore, White & Burd
ATTORNEYS

United States Patent Office

2,907,493
Patented Oct. 6, 1959

2,907,493
CARTON HOLDERS

Leonard J. Drentlaw, Stillwater, Minn., assignor of one-third to P. R. Griebler and one-third to Wayne West-gor, both of Windom, Minn.

Application April 8, 1957, Serial No. 651,450

1 Claim. (Cl. 220—85)

This invention relates to new and useful improvements in carton holders and more particularly to milk cartons of the type provided with a pouring spout.

It is now common practice to distribute milk and other products in paper cartons of various sizes, as, for example, one quart and two quart sizes. A one quart milk carton may be conveniently handled with one hand, when pouring the contents therefrom, but it is extremely difficult to so handle a two quart milk carton with one hand. It is therefore an object of the present invention to provide a holder into which a milk carton may readily be inserted, and by means of which the carton may readily be manipulated to pour its contents therefrom in controlled quantities as one would when pouring milk from an ordinary pitcher.

A further object of the invention is to provide a milk carton holder comprising a supporting frame having a composite handle secured thereto which normally is disposed in flatwise inoperative relation to a wall of the carton supporting frame to facilitate storage, and said composite handle comprising independent handle members which may be swung outwardly into operative positions to provide a convenient grip for a user's hand.

A further object is to provide a milk carton holder comprising an open carton supporting frame having a composite handle pivoted thereto, said handle comprising independent handle members pivoted at their upper and lower ends to the supporting frame and adapted to be swung outwardly away from one another to inoperative positions, said handle members being swingable into operative positions in spaced relation to one another to provide a firm composite grip which may be conveniently grasped to manipulate the holder to pour milk from the carton, said grip being so attached to the holder that when the holder, with a carton supported therein, is manually removed from a refrigerator, or lifted from a table or other support, the composite holder is so balanced in the individual's hand that it may readily be manipulated to pour its contents therefrom without the slightest effort. This feature of balance is a highly desirable one, in that it makes it possible for a housewife to readily and conveniently manipulate a filled carton of milk, or other such cartons to which the holder is applied.

A further object is to provide a holder of the class described wherein a fixed detent is provided on the supporting frame between the upper ends of the handle members adapted to be engaged by said members to retain them in operative spaced relation, when the composite handle is gripped by an individual to pour milk from the carton, or when moving the carton from one place to another.

A further object is to provide a novel collapsible handle structure comprising two pivoted handle members which, when in inoperative collapsed positions, are folded outwardly into a common plane, and when folded inwardly into operative handle-forming positions against a fixed spacing detent, cooperate to provide a firm composite grip which may readily be grasped by an individual's hand.

Other objects of the invention reside in the simple and inexpensive construction of the holder whereby it may be manufactured at low cost; in the unique manner in which the handle members are pivotally mounted on the supporting frame whereby they may readily be swung into parallel relation to a wall of the carton, when not in use, and whereby they may readily be swung into operative spaced parallel relation to provide a firm supporting handle for the milk carton, when pouring its contents therefrom.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claim which follows:

In the drawings:

Figure 1 is a sectional elevation of the novel holder herein disclosed, taken on the line 1—1 of Figure 2, and showing a milk carton disposed therein with its pouring spout open;

Figure 2 is an elevational view of Figure 1 looking at the holder from its handle side;

Figure 3 is a plan view of the holder without a milk carton supported therein, the full and dotted lines indicating the two positions of the handle members;

Figure 4 is a view similar to Figure 2 without the milk carton, but showing the handle members folded into flatwise relation to the supporting frame;

Figure 5 is a fragmentary detail sectional view on the line 5—5 of Figure 4, on a slightly larger scale;

Figure 6 is a detail sectional view on the line 6—6 of Figure 4, on a slightly larger scale;

Figure 8:
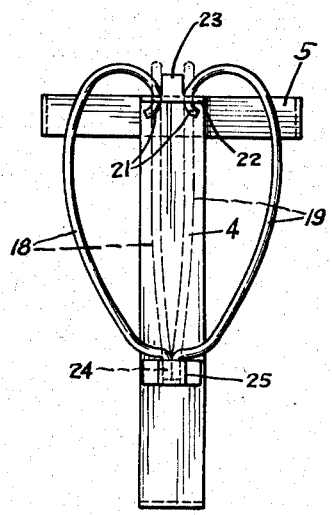
Figure 8 is a view looking at the handle side of the holder shown in Figure 7, the handle members being shown in their inoperative positions in full lines, and the dotted lines indicating the operative positions of the handle members.

The novel carton holder herein disclosed is shown comprising an open frame, generally designated by the numeral 2. Frame 2 comprises a U-shaped strap-like member having a bottom forming portion and spaced upright legs 3 and 4. An angular carton encircling member 5 is secured to the upper ends of the upright legs 3 and 4, and is fashioned to loosely receive the body of the size milk carton to be supported in the holder.

An important feature of the present invention resides in the construction of the composite handle, generally designated by the numeral 6. The composite handle, as best illustrated in Figures 2 and 4, comprises independent handle members 7 and 8 provided at their upper ends with depending pivots 9 and 11, respectively. Pivots 9 and 11 are supported in an outwardly extending portion or ledge 12 of frame member 4. The outwardly extending portion 12 is suitably apertured to receive the pivot terminals 9 and 11 of handle members 7 and 8, as clearly illustrated in Figures 4 and 5.

The lower ends of frame members 7 and 8 are shown provided with upstanding pivots 13 and 14 receivable in a bearing clip, generally designated by the numeral 15. The intermediate portions of handle members 7 and 8 are outwardly curved, as will be understood by reference to Figures 1 and 4, whereby when said handle members are swung inwardly into parallel operative relation, as shown in Figures 2 and 3, they cooperate to provide a convenient firm grip for an individual's grasp, as will be understood.

To thus provide a firm, convenient grip, means is provided for limiting the inward swinging movement of handle members 7 and 8 whereby when in operative positions, they may be disposed in spaced parallel relation, as best shown in Figure 3.

To thus support handle members 7 and 8, a detent 16 is shown integrally formed with the outwardly extending flange or ledge 12 of frame member 4. This detent extends upwardly between the upper ends of handle members 7 and 8 and is so positioned relative to the handle pivots 9 and 11, that when the handle members 7 and 8 are swung inwardly into their parallel operative positions, shown in full lines in Figures 2 and 3, and by the dotted lines 17 in Figure 5, said handle members will engage the opposite vertical side edges of detent 16, whereby the operator or user may firmly grasp the two handle members 7 and 8 as they then cooperate to provide a composite handle by means of which the frame, with a milk carton supported therein, may be readily and conveniently manipulated to pour milk from the carton, or, as when moving the carton from one place to another.

Another important feature of the invention resides in the configuration of the upper portion of the composite handle 6, and its relationship to the upper portion of the supporting frame 2. By reference to Figure 1, it will be noted that the uppermost portion of the composite handle is located well above the top of the annular member 5 of the supporting frame 2. By so fashioning the handle, the holder with a milk carton supported therein, will be so balanced in the individual's hand that a housewife may readily tilt the holder to pour milk from the carton without effort. The handle members 7 and 8 may also be readily swung into their collapsed inoperative positions against the body of the holder, when the holder and carton are returned to the refrigerator for storage.

The novel holder herein disclosed has been found to be extremely practical for the handling of two quart milk cartons. The annular frame member 5 is so proportioned that the body of the milk carton may be freely slid into the holder or removed therefrom, as will be understood by reference to Figure 1. When a carton is inserted into the frame it becomes, in effect, an integral part thereof, whereby the carton may be manipulated as a conventional milk or cream pitcher by simply grasping the composite handle 6 and tilting the carton, as will be understood.

The detent 16 which spaces apart the handle members 7 and 8 is of such width that when the individual grasps the composite handle 6, the handle members 7 and 8 are pressed firmly against the detent 16 to thereby eliminate any possible danger of the handle relatively pivoting with respect to the frame, when pouring milk from the carton. The pivotal mounting of the handle members 7 and 8 on the upright frame member 4 is also important in that it permits the handle members 7 and 8 to be folded into flatwise relation to a wall of the carton, as hereinbefore stated, whereby they take up minimum storage space.

Figure 7:
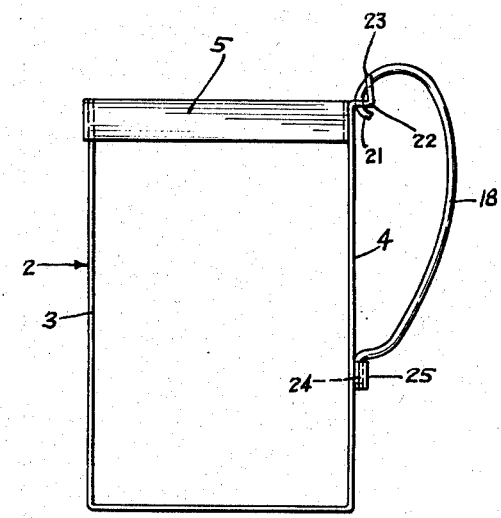
Figure 7 is a side elevational view of a holder having a handle of slightly modified construction.

In Figures 7 and 8 there is shown a holder wherein the handle members 18 and 19 are slightly differently constructed at their upper and lower ends, as may be best noted in Figure 8. As here shown, the upper terminals 21 of handle members 18 and 19 are bent downwardly and curved inwardly and are adapted to be fitted into bearing apertures provided in a ledge or flange 22, similar to the flange 12 shown in Figure 1. A detent 23 spaces apart the upper ends or terminals 21 of handle members 18 and 19 in a manner similar to detent 16, shown in the previous figures. The lower terminals 24 of handle members 18 and 19 are pivotally received in a clip 25 fixed to the frame member 4 and serving as a bearing for the terminals 24.

Figure 10:
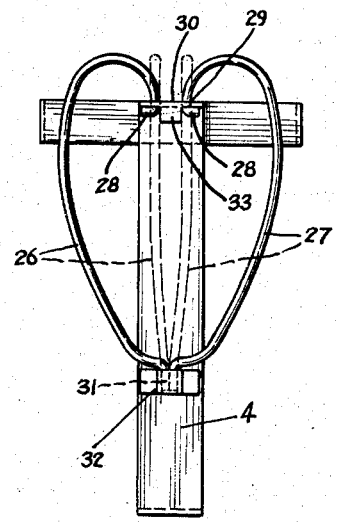
Figure 10 is a view similar to Figure 8, but showing the handle illustrated in Figure 9.
Figure 9:
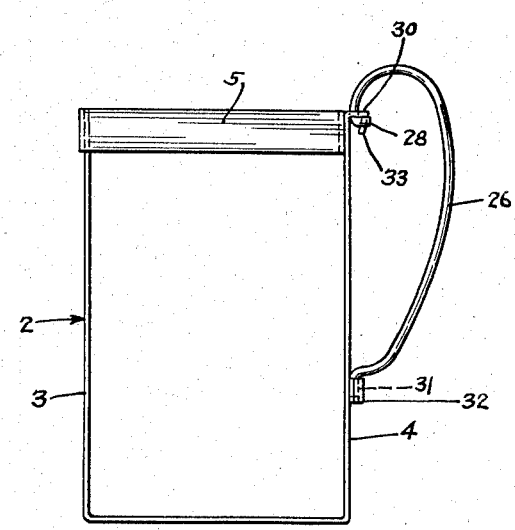
Figure 9 is a view similar to Figure 7, showing a handle construction of slightly modified construction.

Figures 9 and 10 show another form wherein the handle members 26 and 27 have their upper terminals 28 horizontally disposed, whereby when inserted througfh bearing apertures 29 provided in a flange 30, the handle members cannot become detached from their bearings in frame member 4. The lower terminals 31 of handle members 26 and 27 are similar to the lower terminals 24 of handle members 18 and 19, shown in Figures 7 and 8, and are supported in a similar bearing clip 32.

A downwardly extending detent 33 is shown provided between the upper terminals 28—28 of handle members 26 and 27. Detent 33 is so positioned that when the handle members 26 and 27 are swung into their spaced parallel operative positions, indicated by the dotted lines in Figure 10, terminals 28 will engage the opposite side edges of detent 33 and thereby prevent further movement of said handle members towards one another. Handle members 26 and 27 may then be firmly grasped by an individual to manipulate the milk carton to pour milk therefrom.

The novel milk carton holder herein disclosed is extremely simple and inexpensive in construction. The annular frame member 5 at the upper end of the holder may be welded or otherwise secured to the upper ends of the upright legs 3 and 4 of the U-shaped frame member 2. The U-shaped frame member 2 and the annular frame member 5 may, if desired, be formed of plastic material in which case they may be made integral, if desired.

In the foregoing, the composite handle 6 has been shown and described as utilized on a milk carton holder. It is to be understood, however, that it is not to be so limited, as obviously it may be used in conjunction with other forms of holders and containers where a collapsible handle of this general type may be desirable.

The foregoing detailed description has been given for clearness of understanding only, and no unnecessary limitations should be understood therefrom, and the appended claim should be construed as broadly as permissible in view of the prior art.

I claim as my invention:

A composite pouring handle for milk cartons of the type comprising a pouring spout, said handle including an open frame comprising a U-shaped member having spaced vertical legs adapted to embrace opposed upright walls of the carton, an annular horizontally disposed frame member secured to the upper ends of said U-shaped frame member and cooperating with said U-shaped member to receive and support a milk carton, one of the legs of said U-shaped members having its upper end portion bent outwardly to provide a horizontal ledge, the outer edge of said ledge having a reduced end portion, said composite handle comprising independent handle members having inwardly facing vertical terminals, said horizontal ledge having spaced apertures therein for pivotally receiving the terminals at the upper ends of said handle members, means pivotally connecting the lower terminals of said handle members to said upright leg at an elevation spaced downwardly from said horizontal ledge, and said ledge having an upright stop element at said outer end for engaging and limiting outward swinging movement of said handle members, when swung outwardly into operative extended positions, thereby to provide a convenient grip for an individual's hand, when manipulating the carton to pour a portion of its contents therefrom.

References Cited in the file of this patent

UNITED STATES PATENTS

| D. 167,671 | Biggs | Sept. 9, 1952 |
| 2,007,064 | Shipley | July 2, 1935 |
| 2,789,744 | Brooks | Apr. 23, 1957 |

FOREIGN PATENTS

| 193,746 | Great Britain | Mar. 1, 1923 |
| 226,748 | Great Britain | Jan. 1, 1925 |
| 258,161 | Switzerland | Apr. 16, 1949 |